(12) United States Patent
Park

(10) Patent No.: US 10,072,752 B2
(45) Date of Patent: Sep. 11, 2018

(54) METHOD OF CONTROLLING TRANSMISSION OF ELECTRIC VEHICLE

(71) Applicant: HYUNDAI MOTOR COMPANY, Seoul (KR)

(72) Inventor: Jong Yun Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 166 days.

(21) Appl. No.: 15/088,261

(22) Filed: Apr. 1, 2016

(65) Prior Publication Data

US 2017/0152939 A1    Jun. 1, 2017

(30) Foreign Application Priority Data

Nov. 27, 2015  (KR) .................. 10-2015-0167741

(51) Int. Cl.
| | | |
|---|---|---|
| *B60W 10/02* | (2006.01) | |
| *F16H 61/04* | (2006.01) | |
| *F16H 3/12* | (2006.01) | |
| *F16H 3/089* | (2006.01) | |
| *F16H 3/08* | (2006.01) | |

(52) U.S. Cl.
CPC ........... *F16H 61/0403* (2013.01); *F16H 3/12* (2013.01); *F16H 3/089* (2013.01); *F16H 2003/0818* (2013.01); *F16H 2061/0433* (2013.01); *F16H 2200/0039* (2013.01)

(58) Field of Classification Search
CPC .............................. B60W 10/02; B60W 30/19
See application file for complete search history.

(56) References Cited

U.S. PATENT DOCUMENTS

| | | | | |
|---|---|---|---|---|
| 6,502,474 B2 * | 1/2003 | Sakamoto | ............... | B60K 6/48 |
| | | | | 477/181 |
| 2012/0100957 A1* | 4/2012 | Reitz | ..................... | B60K 6/445 |
| | | | | 477/8 |
| 2012/0216638 A1* | 8/2012 | Pritchard | ............... | F16D 21/06 |
| | | | | 74/329 |

FOREIGN PATENT DOCUMENTS

| | | | | |
|---|---|---|---|---|
| JP | 2002021997 A | * | 1/2002 | ............ F16H 61/04 |
| JP | 2007-232046 A | | 9/2007 | |
| JP | 10-2008-0057320 | | 6/2008 | |
| JP | 2015-52394 | | 3/2015 | |
| JP | 2015-87001 | | 5/2015 | |
| KR | 10-1994-0013931 | | 7/1994 | |

OTHER PUBLICATIONS

Machine Translation of JP 2002021997A filed Nov. 12, 2017.*

* cited by examiner

*Primary Examiner* — Tisha D Lewis
(74) *Attorney, Agent, or Firm* — Brinks Gilson & Lione

(57) ABSTRACT

A method of controlling a transmission of an electric vehicle includes: applying a driving force to an actuator of a synchronizer by a controller such that the synchronizer is disengaged from a current gear stage, when a power-on shifting instruction to shift from the current gear stage to a desired gear stage is given; engaging a servo-clutch by the controller such that torque is transmitted from an input shaft to an output shaft through a servo-gear unit, after the applying of a driving force; and disengaging the synchronizer from the current gear stage using a driving force of the actuator, when torque of the current gear stage is switched to the servo-gear unit, after the engaging of the servo-clutch.

5 Claims, 10 Drawing Sheets

METHOD OF CONTROLLING TRANSMISSION OF ELECTRIC VEHICLE

CROSS REFERENCE TO RELATED APPLICATION

The present application claims priority to and the benefit of Korean Patent Application No. 10-2015-0167741, filed Nov. 27, 2015, which is incorporated herein by reference in its entirety.

FIELD

The present disclosure relates to an automotive transmission and, more particularly, to a method of controlling a transmission of an electric vehicle with a motor connected to a transmission input shaft.

BACKGROUND

The statements in this section merely provide background information related to the present disclosure and may not constitute prior art.

An electric vehicle is equipped with a motor that is electrically driven, and the vehicle is driven by power from the motor.

Such a motor, unlike an internal combustion engine of the related art, outputs high torque up to a relatively high speed period from a low speed period, thus a vehicle can be driven by controlling the speed and torque of only the motor. However, when a transmission is added, larger power can be achieved, as compared with the size and capacity of the motor.

Accordingly, electric vehicles are equipped with a transmission capable of adjusting torque and speed in the process of transmitting power from a motor to driving wheels and the transmission has relatively fewer gears, unlike transmission that have been used with an internal combustion engine in the related art, in order to reduce an increase in weight and cost due to the transmission, reduce the size and weight of a motor, and provide power close to that of vehicles equipped with an internal combustion engine in the related art.

As a shifting mechanism that can be achieved in a simple configuration at a low cost and can more efficiently transmit power, there is a synchromesh type used in automatic transmissions of the related art, but in this type, torque interruption that completely blocks torque transmitted to an output shaft is generated in shifting, thereby interfering with smooth shifting. Further, the synchromesh type has a problem in that shock may be generated when a synchronizer is disengaged for shifting.

The foregoing is intended merely to aid in the understanding of the background of the present disclosure, and is not intended to mean that the present disclosure falls within the purview of the related art that is already known to those skilled in the art.

SUMMARY

The present disclosure provides a method of controlling a transmission of an electric vehicle that includes: applying a driving force to an actuator of a synchronizer by means of a controller such that the synchronizer is disengaged from a current gear stage, when a power-on shifting instruction to shift from the current gear stage to a desired gear stage is given; engaging a servo-clutch by means of the controller such that torque is transmitted from an input shaft to an output shaft through a servo-gear unit, after the applying of a driving force; and disengaging the synchronizer from the current gear stage using a driving force of the actuator, when torque of the current gear stage is switched to the servo-gear unit, after the engaging of the servo-clutch.

A gear ratio of the servo-gear unit may be smaller than a gear ratio of the current gear stage and a gear ratio of the desired gear stage.

The method may further include: synchronizing an input shaft speed to a desired speed of a motor directly connected to the input shaft by controlling the servo-clutch by means of the controller, after the disengaging of the synchronizer; engaging the synchronizer with the desired gear stage by operating the synchronizer by means of the controller, after the synchronizing of an input shaft speed is finished; and disengaging the servo-clutch by means of the controller, after the engaging of the synchronizer.

When the current gear stage is larger in gear ratio than the desired gear stage, the controller may reduce a friction force of the servo-clutch to synchronize the input shaft speed with the desired speed of the motor in the synchronizing of an input shaft speed.

When the current gear stage is smaller in gear ratio than the desired gear stage, the controller may control the actuator operating the servo-clutch to synchronize the input shaft speed with the desired speed of the motor in the synchronizing of an input shaft speed.

According to the method of controlling a transmission of an electric vehicle described above, an electric vehicle is equipped with a transmission achieved with a simple configuration and a low cost, so it is possible to decrease the size and capacity of a motor to be mounted in the vehicle and accordingly it is possible to reduce the manufacturing cost and improve fuel efficiency of a vehicle.

Further, since torque interruption and shifting shock are inhibited or prevented in shifting, the shifting quality is improved, which can improve the commercial value of a vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
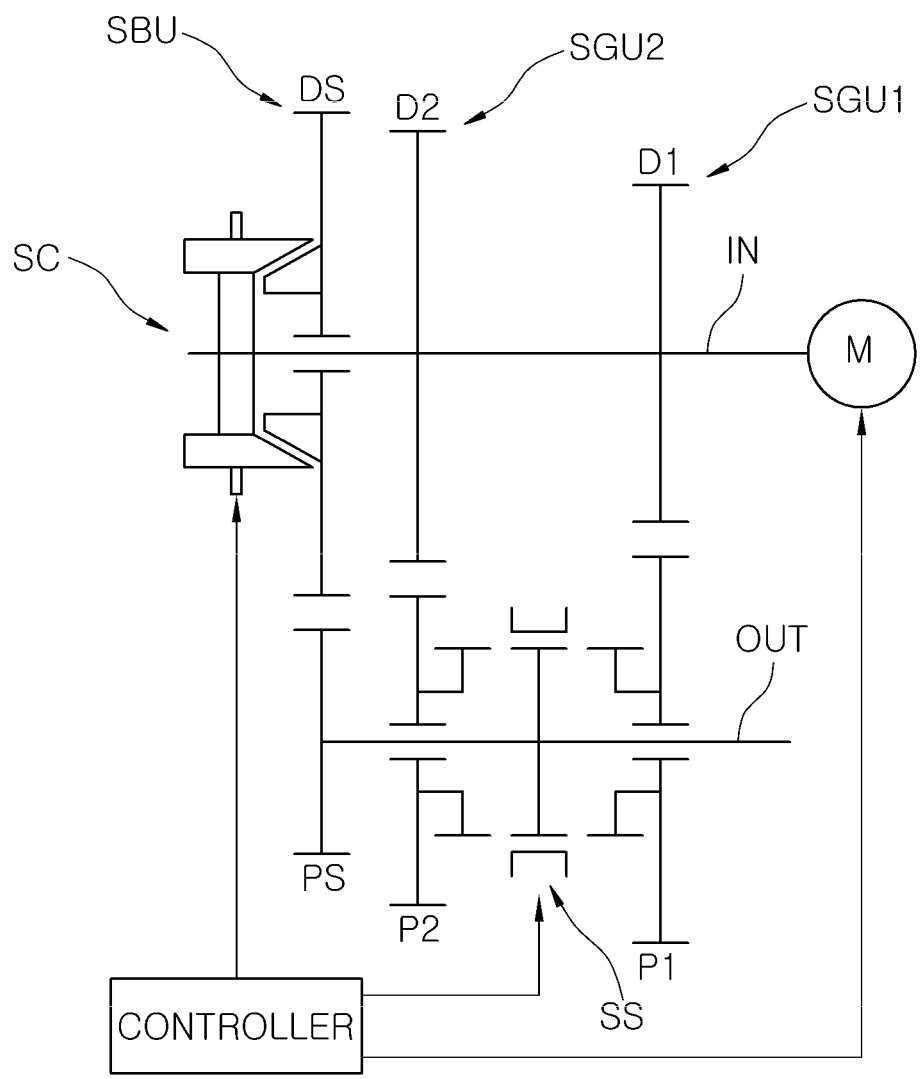
FIG. 1 is a diagram showing the configuration of a transmission of an electric vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram showing the configuration of a transmission of an electric vehicle according to an embodiment of the present disclosure. Referring to FIG. 1, a transmission of an electric vehicle of the present disclosure includes: an input shaft IN that receives power; an output shaft OUT that is disposed in parallel with the input shaft IN; a plurality of shift gear units that are each composed of external gears capable of connecting the input shaft IN and the output shaft OUT to each other to generate different gear ratios; a synchronizer that switches any one of the shift gear units into a power transmissible state or a non-power transmissible state between the input shaft IN and the output shaft OUT; a servo-gear unit SBU that is composed of a pair of external gears engaged with each other on the input shaft IN and the output shaft OUT to provide a gear ratio lower than the gear ratio of the shift gear unit having the lowest gear ratio in the shift gear units; and a servo-clutch SC that can adjust the degree of power transmission between the input shaft IN and the output shaft OUT by the servo-gear unit SBU.

A motor M supplying a driving force to a vehicle is directly connected to the input shaft IN, and the motor M, the synchronizer SS, and the servo-clutch SC can be controlled by a controller CR.

In the shift gear units, any one of the external gear on the input shaft IN and the external gear on the output shaft OUT cannot rotate on the corresponding shaft and the other one can freely rotate on the corresponding shaft. For example, an external gear on the input shaft IN cannot rotate on the input shaft IN, the corresponding external gear (i.e., an external gear engaging with the external gear of the input shaft) on the output shaft OUT can freely rotate on the output shaft OUT.

The synchronizer SS implements the power-transmissible state and the non-power-transmissible state between the input shaft IN and the output shaft OUT by inhibiting or preventing the external gear, which can freely rotate on the corresponding shaft, from rotating on the shaft.

The shift gear units include a first shift gear unit SGU1 having a relatively high gear ratio and a second shift gear unit SGU2 having a relatively low gear ratio. The first shift gear unit SGU1 is composed of a first driving gear D1 not rotating on the input shaft IN and a first driven gear P1 rotating on the output shaft OUT, and the second shift gear unit SGU2 is composed of a second driving gear D2 not rotating on the input shaft IN and a second driven gear P2 rotating on the output shaft OUT.

The synchronizer SS can switch the first driven gear P1 and the second driven gear P2 into a rotatable state and a non-rotatable state on the output shaft OUT by two straight strokes in the axial direction of the output shaft OUT.

That is, the synchronizer SS is disposed on the output shaft OUT and may inhibit or prevent the first driven gear P1 from rotating on the output shaft by engaging a sleeve thereof with a clutch gear integrally connected to the first driven gear P1, or may inhibit or prevent the second driven gear P2 from rotating on the output shaft by engaging the sleeve with a clutch gear integrally connected to the second driven gear P2, or may make a neutral state in which both of the first and second driven gears are not engaged.

Obviously, there may be provided separate synchronizers for connecting/disconnecting the first driven gear P1 to/from the output shaft OUT and for connecting/disconnecting the second driven gear P2 to/from the output shaft OUT.

If the first shift gear unit SGU1 and the second shift gear unit SGU2 are configured such that the first driving gear D1 and the second driving gear D2 cannot rotate on the input shaft IN, and the corresponding first driven gear P1 and second driven gear P2 can freely rotate on the output shaft OUT, the synchronizer SS may be disposed on the output shaft OUT to connect/disconnect the first driving gear D1 and the second driving gear D2 to/from the output shaft OUT.

The servo-gear unit SBU is composed of a servo-driving gear DS that can rotate on the input shaft IN and a servo-driven gear PS that cannot rotate on the output shaft OUT.

The servo-clutch SC is a conical clutch disposed between the input shaft IN and the servo-driving gear DS to be able to adjust the degree of power transmission between the input shaft IN and the servo-driving gear DS in accordance with axial displacement of the input shaft IN.

Obviously, when the servo-driving gear DS is disposed on the input shaft IN without rotating and the servo-driven gear PS is disposed on the output shaft OUT to be rotatable, the servo-clutch SC may be a conical clutch disposed on the output shaft OUT to adjust the degree of power transmission between the output shaft OUT and the servo-driven gear PS.

Figure 2:
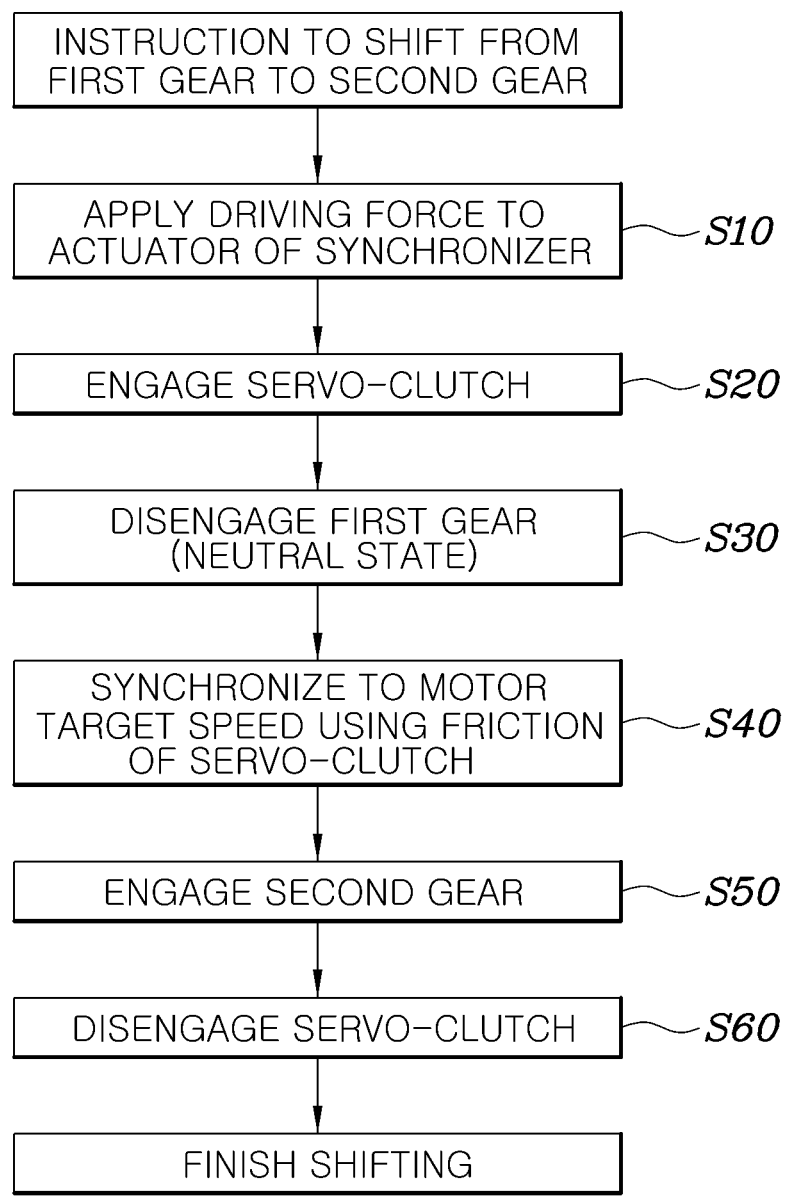
FIG. 2 is a flowchart illustrating an example the transmission of FIG. 1 performing power-on up-shift.
Figure 4:
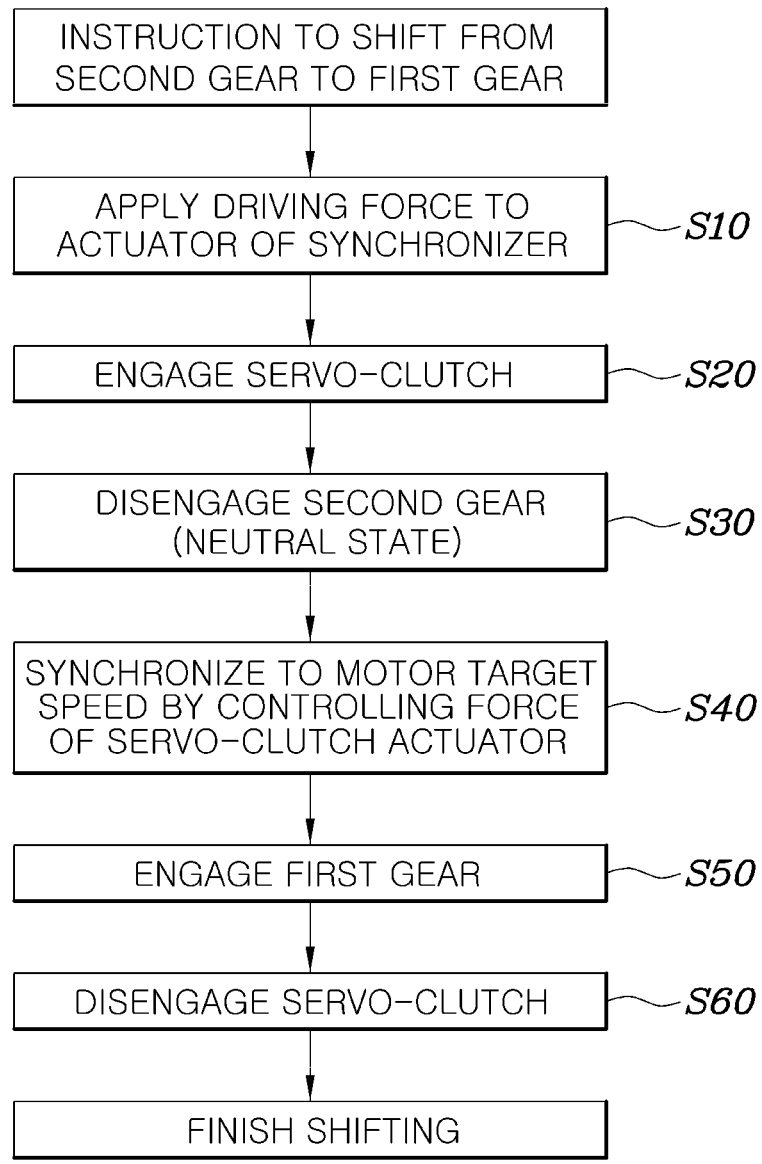
FIG. 4 is a flowchart illustrating an example of the transmission of FIG. 1 performing power-on down-shift.

A method of controlling a transmission of an electric vehicle that has the configuration described above, according to the present disclosure, as shown in FIGS. 2 and 4, includes: applying a driving force to an actuator of the synchronizer by means of the controller such that the synchronizer is disengaged from the current gear stage (S10), when a power-on shifting instruction to shift from a current gear stage to a desired gear stage is given; engaging the servo-clutch by means of the controller such that torque is transmitted from the input shaft to the output shaft through the servo-gear unit (S20) after the applying of a driving force (S10); and disengaging the synchronizer from the current gear stage using the driving force of the actuator, when torque of the current gear stage is switched to the servo-gear unit (S30), after the engaging of the servo-clutch (S20).

The actuator of the synchronizer is provided to move the sleeve, and in the applying of a driving force (S10), the driving force applied to the actuator by the controller may be set smaller than the friction force between tapered sides of teeth of the sleeve and teeth of the clutch gear, in which the friction force is generated when the synchronizer is disengaged from the current gear stage while motor torque is transmitted to the output shaft through the current gear stage.

Obviously, the gear ratio of the servo-gear unit is smaller than the gear ratio of the current gear stage and the gear ratio of a desired gear. That is, the servo-gear unit has a gear ratio smaller than those of the first shift gear unit and the second shift gear unit, so when the servo-clutch is engaged with one of the shift gear units engaged by the synchronizer, the motor torque transmitted to the output shaft through the shift gear unit is switched to be transmitted to the output shaft through the servo-gear unit, and accordingly, the motor torque can be transmitted to the output shaft only through the servo-gear unit.

Further, the method of controlling a transmission of an electric vehicle of the present disclosure may further include: synchronizing an input shaft speed to a desired speed of the motor directly connected to the input shaft by controlling the servo-clutch by means of the controller (S40), after the disengaging of the synchronizer (S30); engaging the synchronizer with a desired gear stage by operating the synchronizer by means of the controller (S50), after the synchronizing of an input shaft speed (S40) is finished; and disengaging the servo-clutch by means of the controller (S60), after the engaging of the synchronizer (S50).

Behavior of a transmission of the present disclosure in power-on up-shift, and the method of controlling the transmission are described with reference to FIGS. 2 to 3E.

Figure 3A:
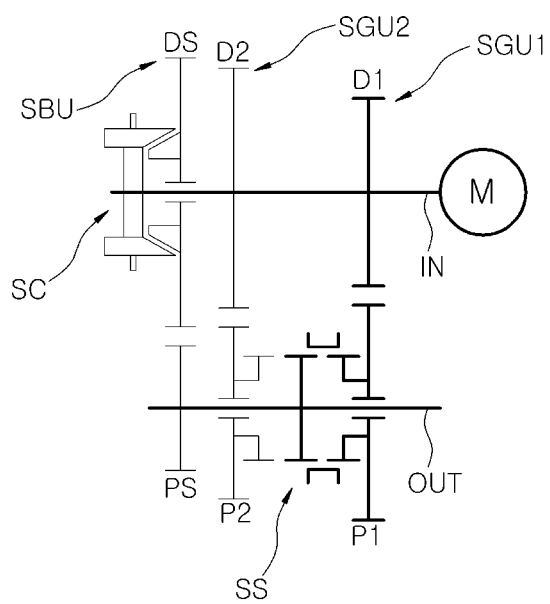
FIG. 3A to 3E are diagrams illustrating the transmission of FIG. 1 performing power-on down-shift.

FIG. 3A shows a state when a vehicle is driven at the first gear stage, in which power from the motor is shifted and transmitted to the output shaft through the first driving gear and the first driven gear, with the synchronizer inhibiting relative rotation between the first driven gear and the output shaft by connecting the first driven gear to the output shaft. In this state, when a driver presses down the acceleration pedal and a power-on up-shift instruction is generated, the controller applies a driving force to the actuator of the synchronizer such that the sleeve is disengaged from the clutch gear of the first driven gear.

However, at the point of time when the motor torque is transmitted to the output shaft through the first driving gear and the first driven gear, a strong friction force is generated between the tapered sides of the teeth of the sleeve and the teeth of the clutch gear due to the difference between the rotational speed of the clutch gear of the first driven gear and the rotational speed of the sleeve. Accordingly, even though a driving force is applied to the actuator, the sleeve is not disconnected from the clutch gear of first driven gear due to the friction force.

Figure 3B:
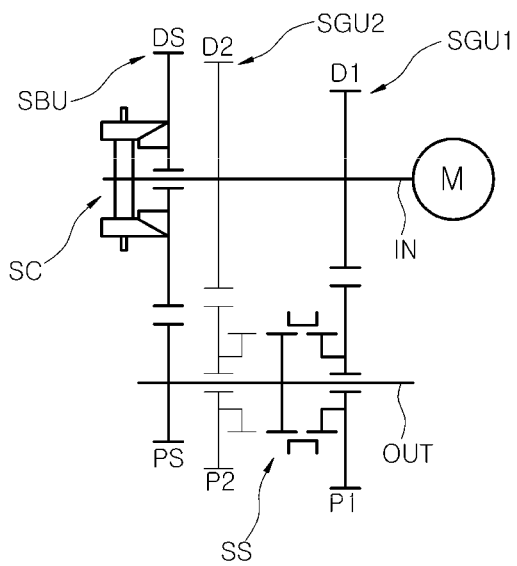

FIG. 3B shows the engaging of the servo-clutch (S20), in which the controller controls the servo-clutch to generate a friction force after applying a driving force to the actuator of the synchronizer.

As described above, when a friction force is generated on the servo-clutch, the torque that has been transmitted to the first driven gear from the first driving gear starts to be transmitted through the servo-gear unit, because the gear ratio of the servo-gear unit is smaller than the gear ratio of the first gear stage.

Figure 3C:
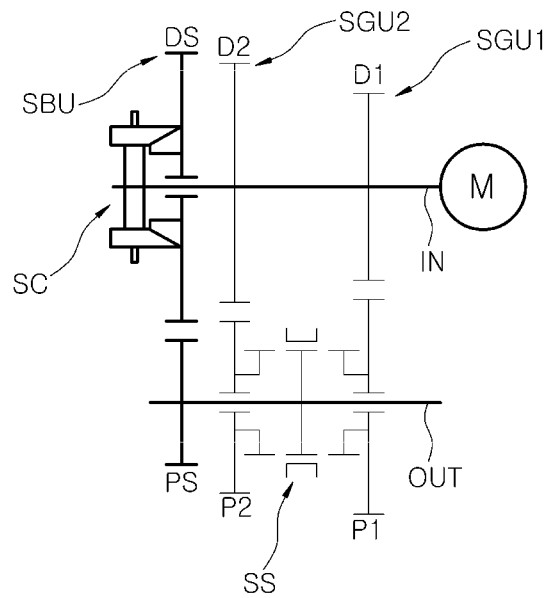

Thereafter, when the torque transmitted between the first driving gear and the first driven gear and the torque transmitted to the servo-gear unit become the same, the sleeve of the synchronizer is disengaged from the clutch gear by the driving force applied to the actuator, as shown in FIG. 3C. Accordingly, the sleeve of the synchronizer can be smoothly separated from the clutch gear without shock or noise.

Since torque of the input shaft is transmitted to the output shaft through the servo-gear unit, torque for driving the vehicle is continuously transmitted to the output shaft without torque interruption in the transmission.

Figure 3D:
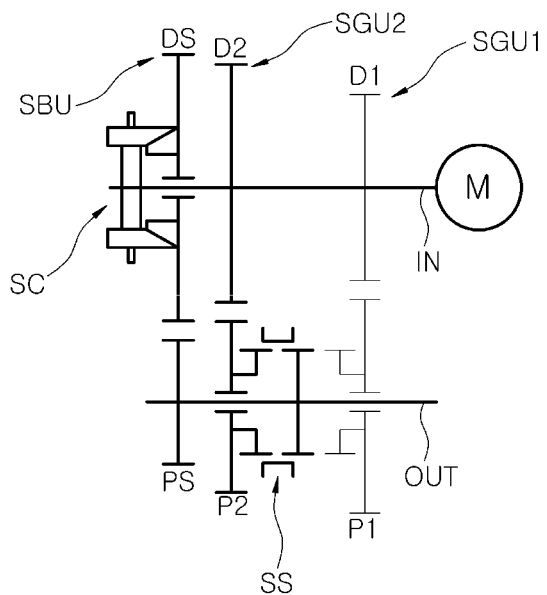

Thereafter, the controller controls the servo-clutch such that the input shaft speed is synchronized with a desired speed of the motor, so when the desired gear stage is synchronized with the synchronizer, the sleeve of the synchronizer is engaged with the clutch gear of the second driven gear that is the desired gear stage, as shown in FIG. 3D, thereby performing the engaging of the synchronizer (S50).

In particular, in power-on up-shift when the current gear stage is larger in gear ratio than the desired gear stage, the controller can synchronize the input shaft speed with the desired speed of the motor by reducing the friction force of the servo-clutch in the synchronizing of an input shaft speed (S40). That is, by partially disengaging the servo-clutch, it is possible to reduce the friction force and reduce the input shaft speed to the desired speed of the motor.

Figure 3E:
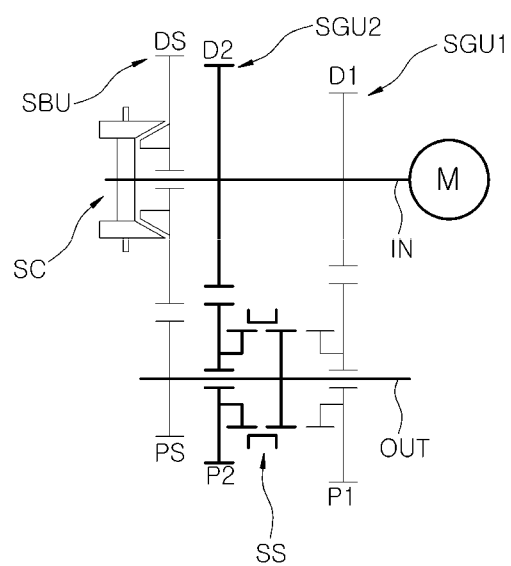

When the sleeve of the synchronizer is engaged with the clutch gear of the second driven gear, the controller can finish the power-on up-shift, as shown in FIG. 3E, by disengaging the servo-clutch.

Accordingly, in the process of shifting the synchronizer engaged with the current gear stage to the desired gear stage, it is possible to inhibit or prevent torque interruption in which torque to be transmitted to the output shaft is not transmitted and it is also possible to enter a neutral stage smoothly without shock when the synchronizer is disengaged from the current gear stage, so the shifting quality can be improved.

Figure 5A:
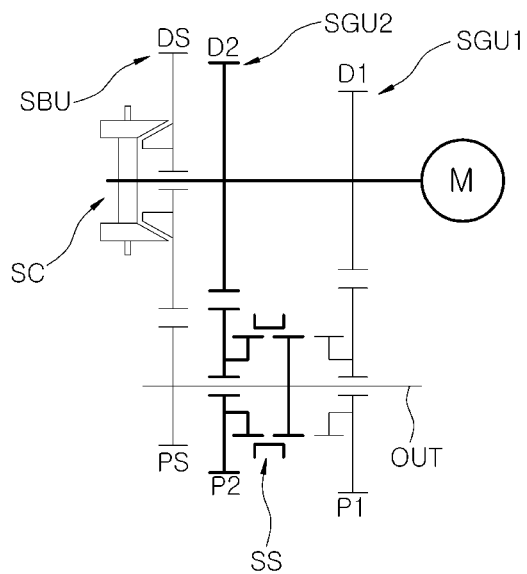
FIG. 5A to 5E are diagrams illustrating the transmission of FIG. 1 performing power-on down-shift.
Figure 5B:
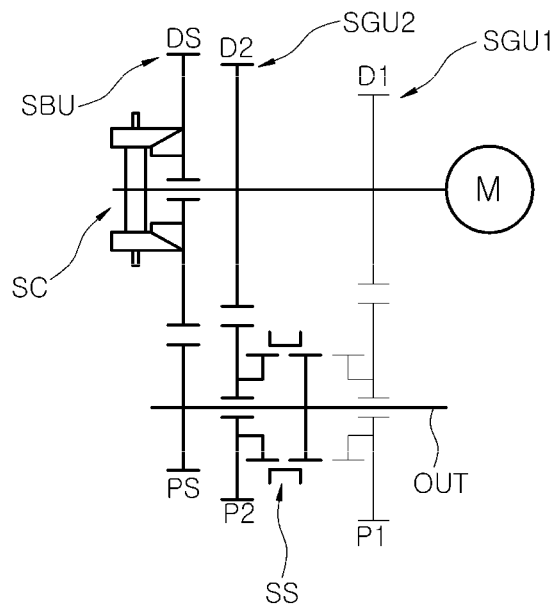
Figure 5C:
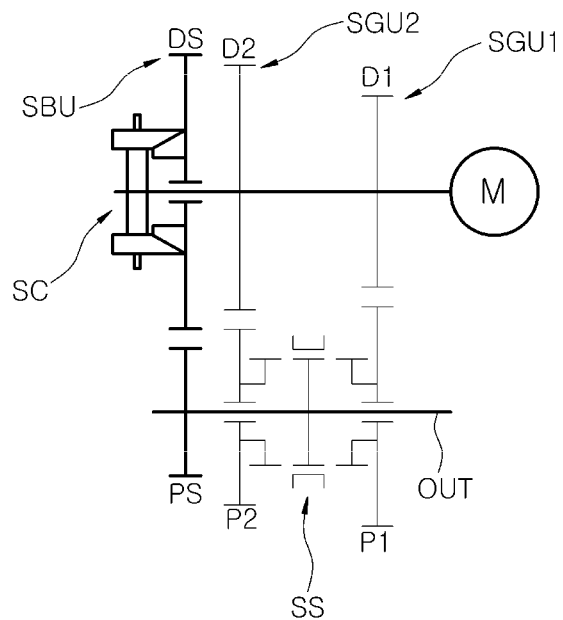
Figure 5D:
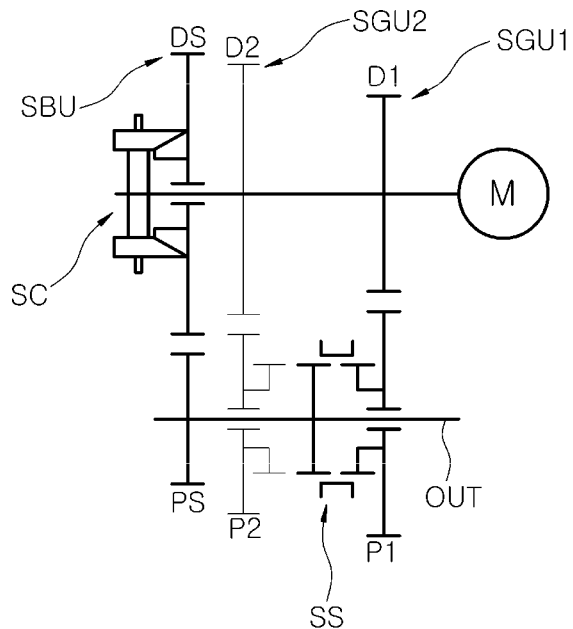
Figure 5E:
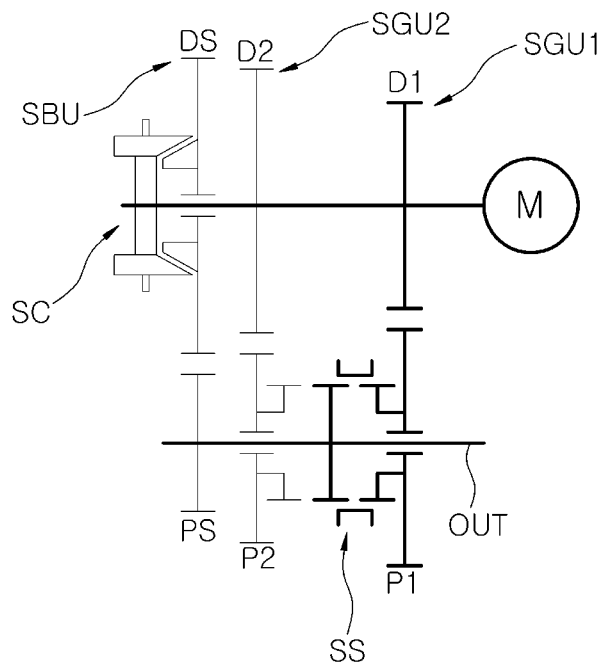

FIGS. 4 to 5E are diagrams illustrating power-on down-shift, which exemplify shifting from the second gear that is the current gear stage to the first gear that is the desired gear stage.

FIG. 5A shows a state when a vehicle is driven at the first gear stage, in which power from the motor is shifted and transmitted to the output shaft through the second driving gear and the second driven gear, with the synchronizer inhibiting relative rotation between the second driven gear and the output shaft by connecting the second driven gear to the output shaft. In this state, when a driver presses down the acceleration pedal and a power-on up-shift instruction to shift to a lower gear stage is generated, the controller applies a driving force to the actuator of the synchronizer such that the sleeve is disengaged from the clutch gear of the second driven gear.

However, since motor torque is transmitted to the output shaft through the second driving gear and the second driven gear, there is a difference between the rotational acceleration of the clutch gear of the second driven gear and the rotational acceleration of the sleeve, so a strong friction force is generated between the tapered sides of the teeth of the sleeve and the teeth of the clutch gear, and accordingly, the sleeve is not disengaged from the clutch gear of the second driven gear by the friction force even under the driving force of the actuator.

FIG. 5B shows the engaging of the servo-clutch (S20), in which the controller controls the servo-clutch to generate a friction force. Since the gear ratio of the servo-gear unit is smaller than the gear ratio of the second gear stage, when a friction force is generated on the servo-clutch, as described above, torque that has been transmitted from the second driving gear to the second driven gear is transmitted through the servo-gear unit, and the torque transmitted to the servo-gear unit and the torque transmitted to the second driving gear and the second driven gear become the same at a specific point of time.

As in FIG. 5C, the disengaging of the synchronizer (S30) in which the sleeve is disengaged from the clutch gear of the second driven gear by the driving force applied to the actuator by the controller is performed. That is, since the rotational speeds of the sleeve and the clutch gear of the second driven gear become the same, the sleeve can be smoothly disengaged from the clutch gear without shock or noise, thereby improving the shifting quality.

Thereafter, the controller controls the servo-clutch such that the input shaft speed is synchronized with a desired speed of the motor, so when the desired stage is synchronized with the synchronizer, the sleeve of the synchronizer is engaged with the clutch gear of the first driven gear that is the desired stage, as shown in FIG. 5D, thereby performing the engaging of the synchronizer (S50). The controller can synchronize the input shaft speed with the desired speed by increasing the input shaft speed to the desired speed of the motor, using the servo-clutch actuator.

After the engaging of the synchronizer (S50) is finished, the controller can finish the power-on down-shift by disengaging the servo-clutch, as in FIG. 5E.

Accordingly, during the power-on down-shift, it is possible to smoothly enter a neutral state without torque interruption, in which torque transmitted to the output shaft is stopped, and without shock in disengagement of the synchronizer, so the shifting quality can be improved and the commercial value of the vehicle can be increased.

Figure 6A:
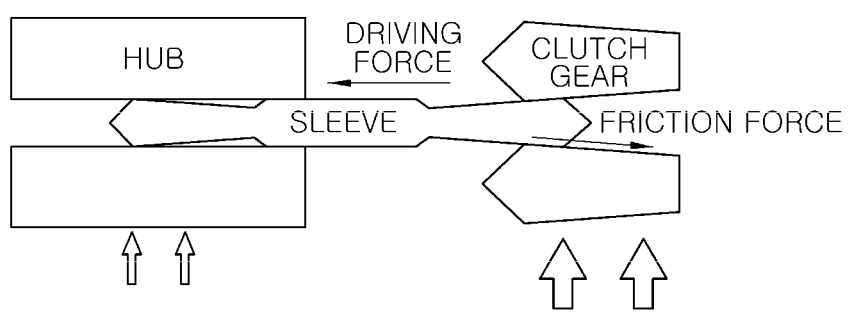
FIGS. 6A to 6C are perspective views showing operation of a synchronizer according to an embodiment of the present disclosure.
Figure 6B:
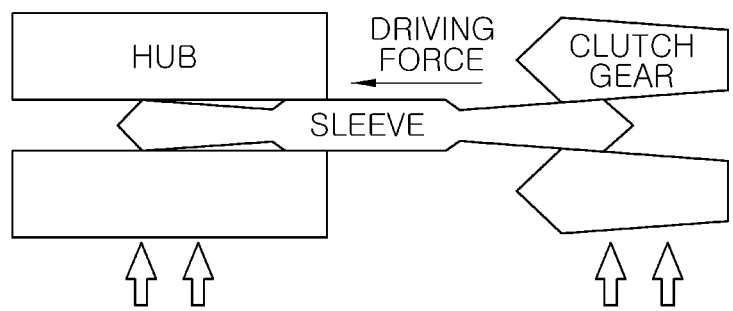
Figure 6C:
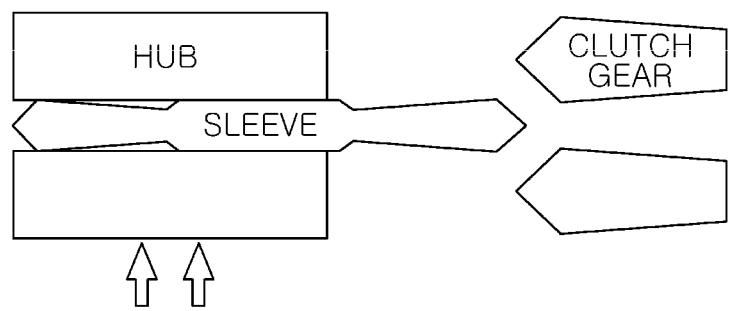

FIGS. 6A to 6C are perspective views showing operation of a synchronizer according to an embodiment of the present disclosure. In FIG. 6A, with torque of the input shaft transmitted to the output shaft through the current gear stages, a power-on shifting instruction is given and a driving force is applied to the sleeve of the synchronizer. However, a large amount of motor torque is transmitted to the current driven gear, so a large friction force is generated between the tapered sides of the teeth of the sleeve and the teeth of the clutch gear, and the sleeve cannot be disengaged from the clutch gear accordingly.

FIG. 6B shows a state when the same amount of motor torque is transmitted to the servo-gear unit and the current gear stage FIG. 6C shows a later state when the sleeve is disengaged from the clutch gear of the current gear stage by the driving force of the actuator.

That is, when the same amount of motor torque is transmitted to the servo-gear unit and the current gear stage, the rotational speed of the sleeve of the synchronizer and the rotational speed of the clutch gear are the same and the sleeve is disengaged from the clutch gear by the driving force in this stage, so the synchronizer can be disengaged without shock.

According to the method of controlling a transmission of an electric vehicle described above, an electric vehicle is equipped with a transmission achieved with a simple configuration and a low cost, so it is possible to decrease the size and capacity of a motor to be mounted in the vehicle and accordingly it is possible to reduce the manufacturing cost and improve fuel efficiency of a vehicle.

Further, since torque interruption and shifting shock are inhibited or prevented in shifting, the shifting quality is improved, which may improve the commercial value of a vehicle.

Although the present disclosure was described with reference to specific embodiments shown in the drawings, it is apparent to those skilled in the art that the present disclosure may be changed and modified in various ways without departing from the scope of the present disclosure.

What is claimed is:

1. A method of controlling a transmission of an electric vehicle, the method comprising:
   applying, by a controller, a driving force to an actuator of a synchronizer engaged with a first gear unit forming a current gear stage, when a power-on shifting instruction to shift from the current gear stage to a desired gear stage is given;
   engaging a servo-clutch with a servo-gear unit by the controller while maintaining the synchronizer being engaged with the first gear unit such that torque transmitted from an input shaft to an output shaft through the first gear unit and torque transmitted from the input shaft to the output shaft through the servo-gear unit become the same; and
   disengaging the synchronizer from the first gear unit using a driving force of the actuator when the torque transmitted from the input shaft to the output shaft through the first gear unit and torque transmitted from the input shaft to the output shaft through the servo-gear unit become the same.

2. The method of claim 1, wherein a gear ratio of the servo-gear unit is smaller than a gear ratio of the current gear stage and a gear ratio of the desired gear stage.

3. The method of claim 1, further comprising:
   synchronizing an input shaft speed to a desired speed of a motor directly connected to the input shaft by controlling the servo-clutch using the controller, after the synchronizer disengaged;
   engaging the synchronizer with a second gear unit forming the desired gear stage by the controller, after the synchronizing of an input shaft speed is finished; and
   disengaging the servo-clutch by the controller, after the engaging of the synchronizer with the second gear unit.

4. The method of claim 3, wherein when the current gear stage is larger in gear ratio than the desired gear stage, the controller reduces a friction force of the servo-clutch to synchronize the input shaft speed with the desired speed of the motor in the synchronizing of an input shaft speed.

5. The method of claim 3, wherein when the current gear stage is smaller in gear ratio than the desired gear stage, the controller controls the actuator operating the servo-clutch to synchronize the input shaft speed with the desired speed of the motor in the synchronizing of an input shaft speed.

* * * * *